Nov. 21, 1933.  E. J. GALLAGHER, JR  1,936,505
WINDSHIELD WIPER
Filed April 12, 1932
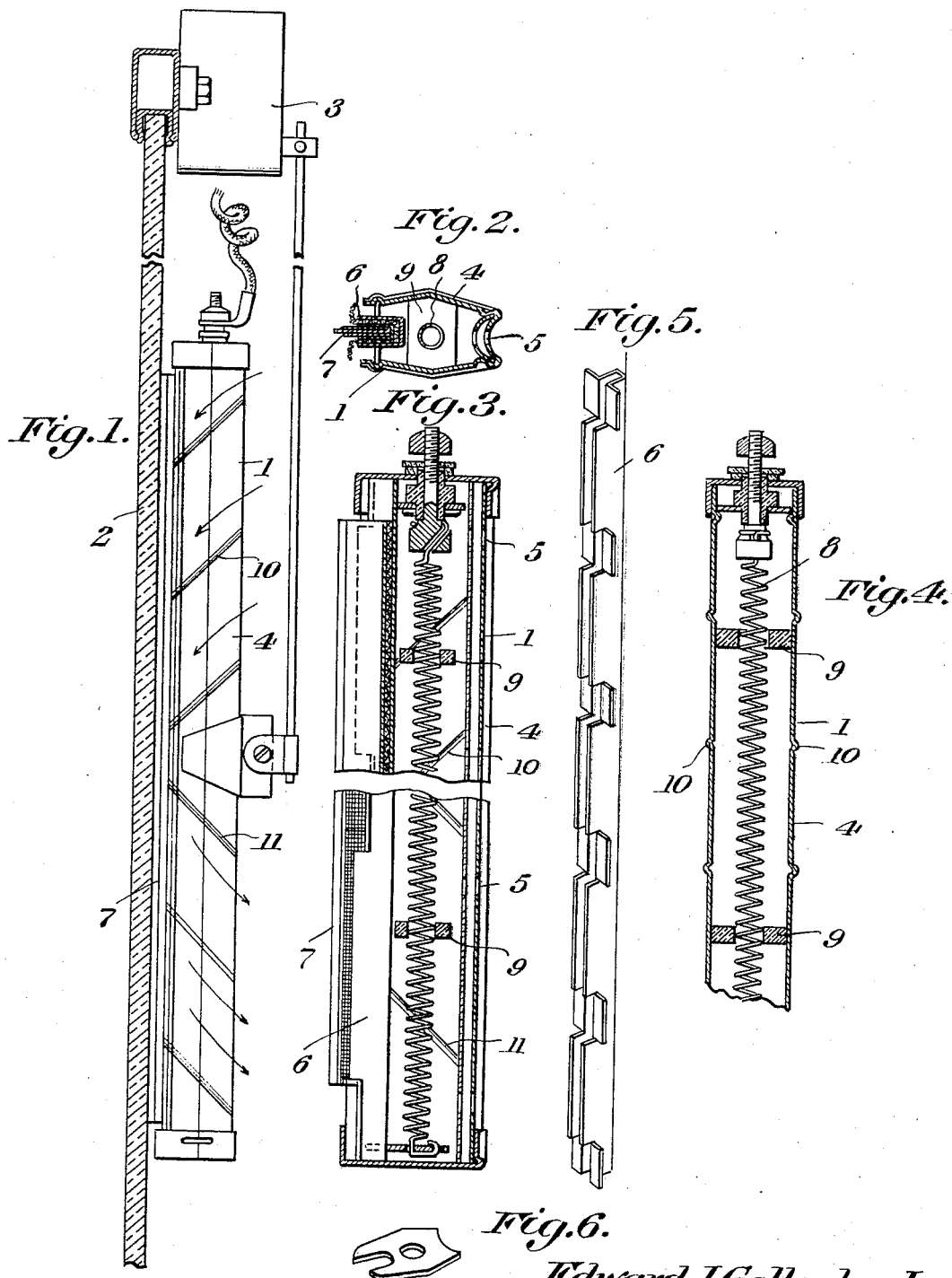
Edward J. Gallagher Jr.
INVENTOR
BY Victor J. Evans & Co.
ATTORNEYS Patented Nov. 21, 1933

1,936,505

UNITED STATES PATENT OFFICE 1,936,505

WINDSHIELD WIPER

Edward J. Gallagher, Jr., Baltimore, Md.

Application April 12, 1932. Serial No. 604,790

3 Claims. (Cl. 15—250)

This invention relates to windshield wipers of the character set forth in my co-pending application filed December 21, 1931; Serial No. 582,432, and has for the primary object, the provision of means for directing onto the glass of a windshield liquid heated by the heat from the wiper so that moisture, rain or the like, freezing on the glass will be caused to melt and pass off the portion of the glass engaged by the wiper.

Another object of this invention is the provision of means whereby accumulated liquid from rain, melted snow, or ice will be removed from the portion of the glass of the windshield engaged by the wiper and discharged away from the glass and the wiper.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating the windshield wiper associated with the glass of the windshield and constructed in accordance with my invention.

Figure 2 is a transverse sectional view of the wiper element.

Figure 3 is a vertical sectional view illustrating the same.

Figure 4 is a fragmentary vertical sectional view illustrating the mounting of the heating coil within the wiper element.

Figure 5 is a perspective view illustrating the wiper blade or strip support.

Figure 6 is a perspective view illustrating a combined anchoring element and ground contact for the heating coil.

Referring in detail to the drawing, the numeral 1 indicates a wiper blade adapted to be moved back and forth relative to the outer face of the glass 2 of a windshield by a conventional type of operating means 3. The wiping blade consists of a hollow casing 4 fully opened at one edge while its opposite edge is provided with perforations 5 to permit circulation of air through the casing towards the glass 2. A supporting strip 6 is mounted in the opened edge of the casing 4 as clearly shown in Figure 2 and supports a wiping strip 7 adapted to contact with the glass and is partially surrounded by foraminous material to aid in directing heat to the glass of the windshield and which forms the subject-matter of my co-pending application.

An electrical heating element 8 is mounted in the casing and spaced from walls thereof by insulated spacing elements 9. The air passing through the casing 4 is heated by coming in contact with the electrical heating element 8 and strikes against the glass 2 at opposite sides of the wiper strip.

Each side wall of the casing 4 is provided with groups of ribs 10 and 11 to strengthen the casing. The groups of ribs 10 are arranged above the groups of ribs 11 when the wiper is used on a windshield as shown in Figure 1. The ribs 10 extend upwardly and outwardly with respect to the windshield, while the ribs 11 extend downwardly and outwardly of the windshield. In use, the upper portion of the casing 4 is heated to a higher temperature than the lower portion thereof due to the rise of heat from the heating element. Therefore, snow and sleet caught by the upper portion of the casing from the glass of the windshield will be heated to readily slide from the casing and due to the ribs 10 will be directed towards the glass for gravitation thereover, warming the glass. This sleet or snow will be caught by the lower portion of the wiper strip 7 and caused to bank on the lower portion of the casing which is also heated, and due to the ribs 11 will be directed off of the casing into a space away from the windshield. With this construction of wiper the glass of the windshield will be warmed and thereby prevent the freezing of sleet and snow on the glass.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A windshield wiper including a heated wiper casing and a wiper strip to engage the glass of a windshield, and means on said casing to direct liquid accumulated on the casing and heated by contact therewith toward the glass for melting snow or ice accumulated on the portion of said glass engaged by the strip.

2. A windshield wiper including a heated wiper casing and a wiper strip to engage the glass of a windshield in a depending position, and ribs on said casing to direct melting snow or sleet towards the glass for aiding in warming the latter to prevent formation of ice thereon.

3. A windshield wiper including a heated wiper casing and a wiper strip to engage the glass of a windshield in a depending position, upper and lower groups of ribs on said casing, the upper group of ribs being inclined upwardly and outwardly from the wiper strip and the lower group of ribs being inclined downwardly and outwardly from said wiper strip, said upper group of ribs adapted to direct melted snow or sleet on the casing towards the glass for aiding in warming the latter to prevent the accumulation of ice thereon, said lower group of ribs acting to direct snow or sleet taken up by the upper portion of the strip and passed onto the lower portion of the strip away from the latter and the glass of the windshield.

EDWARD J. GALLAGHER, Jr.